April 19, 1932. A. SCHNEIDER 1,855,001
STEAM GENERATOR
Filed Sept. 18, 1930
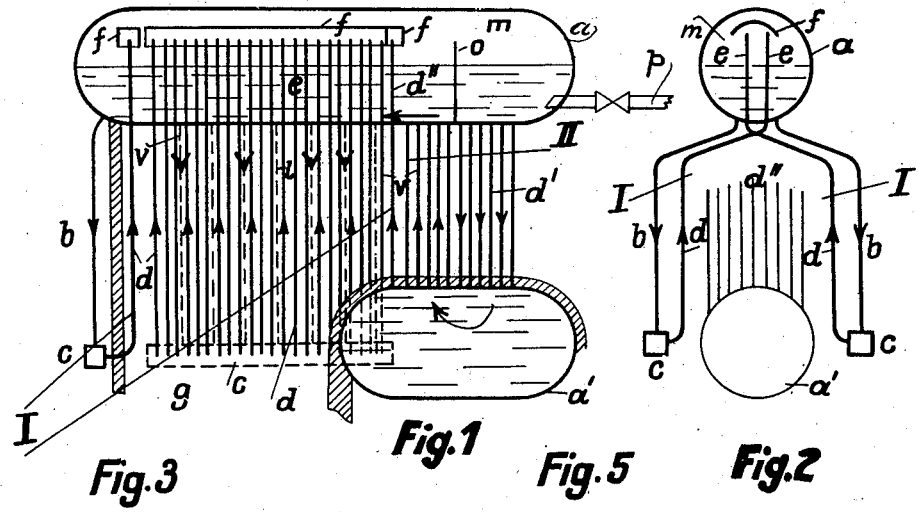
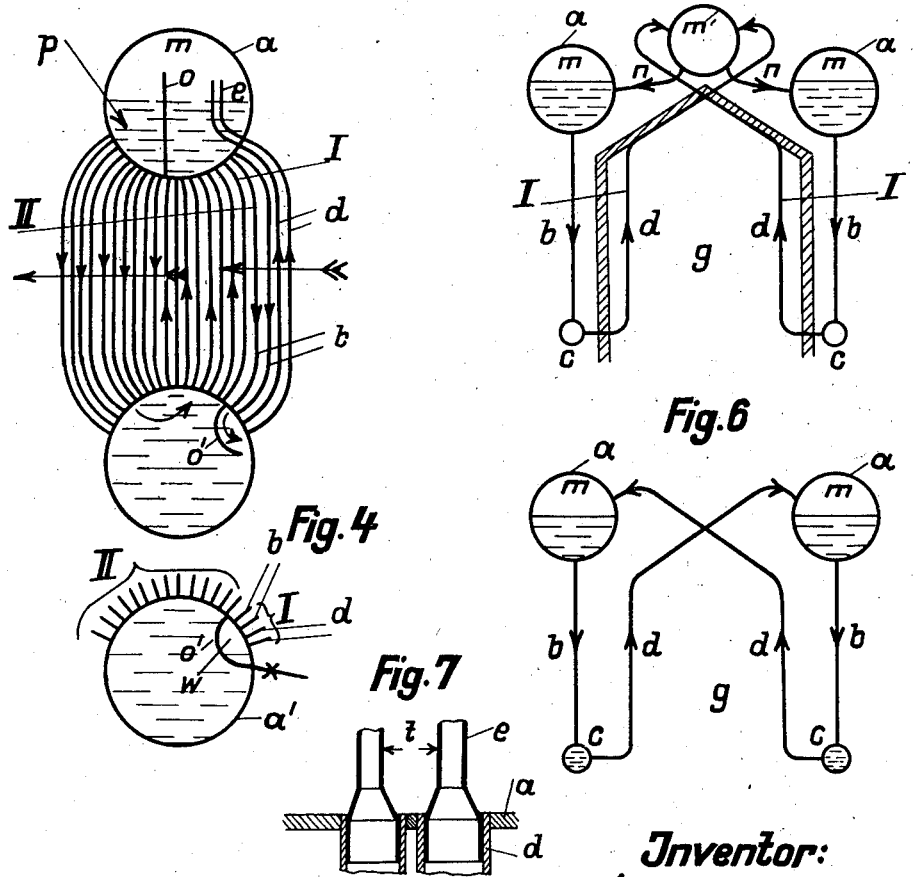
Inventor:
ADOLF SCHNEIDER.
By W. T. Cuff...
Att'y.

Patented Apr. 19, 1932

1,855,001

UNITED STATES PATENT OFFICE

ADOLF SCHNEIDER, OF MUNICH, GERMANY

STEAM GENERATOR

Application filed September 18, 1930, Serial No. 482,706, and in Germany December 15, 1928.

The present invention relates to a steam generator installation comprising a section exposed to radiant heat and a section to which heat is communicated by conduction.

Steam boiler installations of this type are not broadly new. The novelty of the invention resides in the mode of assembling the sections in relation to one another and to the steam space or spaces associated therewith whereby there is obtained a construction of maximum steaming capacity and maximum efficiency in operation.

Characteristic of the invention is the feature that the section or surface exposed to radiant heat constitutes a self contained circuit shorted in the associated steam space, and that water that has traversed the surface heated by conduction is led to the said circuit to compensate for the evaporation in said circuit. There are thus obtained important advantages as regards the efficiency of the plant and also as regards the maximum capacity to which the heating surfaces may be loaded, while dry steam is supplied. Thus, the surface exposed to radiant heat being caused to operate in a circuit short-circuited in the steam space, evaporation is effected at a rapid rate in the surface exposed to radiant heat while accumulation of water in the upper drum presenting the steam space is avoided. The circuit devised as stated thus lends itself to the convenient addition of make-up water while preventing hot water from flowing off into colder parts of the boiler as, for example, the surface heated by conduction. Thereby uneconomical use of the surface heated by conduction is avoided. Further also, uneconomical use of the surface exposed to radiant heat is avoided by reason that there are provided means which permit only water preheated in the surface heated by conduction to pass to the surface exposed to radiant heat. The make-up water required by the section exposed to radiant heat, that is, the hottest part of the boiler can be preheated on its way over the surface heated by conduction in correspondence with the temperature gradient of the furnace gases while avoiding sudden uneconomical temperature drops so that regularity of operation is ensured.

In Figs. 1 and 2 there is illustrated diagrammatically one embodiment of the invention.

Fig. 3 is a diagrammatic view of a boiler or part of a boiler, operating in accordance with my invention.

Fig. 4 is a detail view showing the baffle forming a closed space within the lower drum.

Fig. 5 is a diagrammatic view showing an independent steam space.

Fig. 6 is a similar view showing two steam and water drums interconnected by tubes.

Fig. 7 is a detail view showing the tube extensions.

$a$ denotes the upper steam and water drum. I denotes the circuit exposed to radiant heat and short-circuited within the drum $a$. The circuit includes upcomer tubes $d$ and downcomer tubes $b$ connected, respectively, to the steam space $m$ and to the water space of the drum $a$. $e$ are extensions of the tubes $d$ with in the drum $a$. $f$ are baffles within the drum $a$. II denotes the surface heated by conduction.

Fresh feed water enters the drum $a$ at $p$. $g$ denotes the combustion chamber.

To prevent water which has not been heated from passing into the circuit I exposed to radiant heat a partition $o$ is provided within the drum $a$. Due to the provision of the partition $o$ water is confined to follow a predetermined path over the surface II heated by conduction, for example, downwards through tubes $d'$ to a lower drum $a'$, whence the water rises generally to the upper drum $a$ in which it can cross over to the circuit I exposed to radiant heat. In the case illustrated the front tube $d''$ nearest to the combustion chamber comprised in the tubes of the surface II heated by conduction are also exposed to radiant heat. Naturally, these tubes may be included with the tubes comprised in the circuit I exposed to radiant heat. Depending on the conditions of operation, the dimensions of the tubes etc., the group of tubes $d''$ may themselves constitute a circuit short-circuited within the drum $a$, the tubes heated by conduction immediately behind the tubes $d''$ being used as downcomers. The tubes $d''$ need not constitute a circuit in themselves as they receive only water from the lower drum $a'$, that is, from a part only of the surface heated by conduction. Alternatively, the tube $d''$ may be supplied with water part of which has traversed the entire surface heated by conduction and part of which has traversed part only of the surface heated by conduction. Yet again, the tubes $d''$ may be used to convey water from a part of the surface heated by conduction to the surface exposed to radiant heat, that is, to the tubes $b$.

In the construction shown in Figs. 1 and 2 water flows through the tubes $d'$ in counter flow; the water may, however, flow in one direction only or may follow paths transverse to one another.

Fig. 3 shows a boiler or part of a boiler operating in accordance with the above description. The baffle $o'$ in the lower drum $a'$ is so fitted as to permit the tubes $b$ to operate as downcomers for the upcomer tubes $d$. If required, the baffle $o'$ may be arranged to enclose within the lower drum $a'$ a closed space $u$ from which mud can be withdrawn and to which are connected tubes $b$ as downcomers and tubes $d$ as upcomers; see, for example, Fig. 4.

In the construction according to Figs. 1 to 4 a separate steam space is not provided for the circuit exposed to radiant heat. According to Fig. 5, however, an independent steam space $m'$ is provided, said steam space $m'$ having provision whereby water of condensation may be drawn off, for example, through tubes $n$ connected to steam and water drums $a$ located at a lower level and fitted with the downcomer tubes $b$.

In the construction according to Fig. 6 two steam and water drums $a$ are interconnected by tubes in such wise that one drum feeds the other. This construction offers the advantage that balance of water level in the entire plant can be ensured.

It will be seen from the drawings that the tubes $d$ serve to define the combustion chamber, further adding to the advantages aforesaid in respect that there is thereby obtained increased evaporation and a more rapid flow of water over the surface heated by conduction.

Fig. 7 is a detail view showing the tube extensions $e$ for leading the mixture of steam and water from the tubes $d$ into the steam space $m$ of the upper drum $a$. As is well-known, high pressure drums are of very small diameter for which reason there are used extensions which are contracted so that water can pass through the gaps or intervals $t$ between the said extensions.

In the drawings there is shown a lower drum $a'$ for coupling the downcomers and upcomers of the system II. With very hi steam pressures the use of such a lower dru $a'$ may be dispensed with, provided that mai folds are arranged one above the other ex rior to the boiler structure and connected wi the upper portion of the boiler by means downcomers and upcomers.

I claim:—

In a steam generator installation of t character described and in combination, : upper steam and water drum having a fe water inlet therein, a lower water drum, group of downcomer and upcomer tubes hea ed by conduction connecting said drums, co nected upcomer and downcomer tubes con municating respectively with the steam spa and the water space of the upper drum an adapted to be exposed to radiant heat, baffl in the upper drum and a partition wall withi said drum between the feed water inlet an the inlets of said last mentioned downcomei whereby the feed water first travels the tube heated by conduction and then travels th group of tubes exposed to radiant heat.

In witness whereof I have hereunto se my hand.

ADOLF SCHNEIDER.